US009660450B2

(12) United States Patent
Li et al.

(10) Patent No.: US 9,660,450 B2
(45) Date of Patent: May 23, 2017

(54) MONITORING SYSTEM AND METHOD FOR MEGAWATT LEVEL BATTERY ENERGY STORAGE POWER PLANT

(71) Applicants: ZHANGJIAKOU WIND AND SOLAR POWER ENERGY DEMONSTRATION, Zhangjiakou (CN); CHINA ELECTRIC POWER RESEARCH INSTITUTE, Beijing (CN); STATE GRID CORPORATION OF CHINA, Beijing (CN)

(72) Inventors: Xiangjun Li, Beijing (CN); Dong Hui, Beijing (CN); Xiaokang Lai, Beijing (CN); Xuecui Jia, Beijing (CN); Liye Wang, Beijing (CN); Guangchao Guo, Beijing (CN); Ping Wang, Beijing (CN); Yanting Liang, Beijing (CN); Liang Zhang, Beijing (CN)

(73) Assignees: ZHANGJIAKOU WIND AND SOLAR POWER ENERGY DEMONSTRATION, Zhangjiakou (CN); CHINA ELECTRIC POWER RESEARCH INSTITUTE, Beijing (CN); STATE GRID CORPORATION OF CHINA, Beijing (CN)

( * ) Notice: Subject to any disclaimer, the term of this patent is extended or adjusted under 35 U.S.C. 154(b) by 0 days.

(21) Appl. No.: 14/123,518

(22) PCT Filed: Oct. 17, 2013

(86) PCT No.: PCT/CN2013/085410
§ 371 (c)(1),
(2) Date: Dec. 3, 2013

(87) PCT Pub. No.: WO2015/054869
PCT Pub. Date: Apr. 23, 2015

(65) Prior Publication Data
US 2016/0218511 A1 Jul. 28, 2016

(51) Int. Cl.
F16D 31/02 (2006.01)
G06Q 50/06 (2012.01)
(Continued)

(52) U.S. Cl.
CPC ............... *H02J 3/32* (2013.01); *G05B 13/04* (2013.01); *H02S 10/20* (2014.12)

(58) Field of Classification Search
CPC .. G06Q 50/06; H02J 3/008; H02J 3/32; H02J 3/28; Y04S 50/10; Y04S 50/14; F01K 25/06; F01K 27/00
See application file for complete search history.

(56) References Cited

U.S. PATENT DOCUMENTS 8,706,650 B2 * 4/2014 Ozog ..................... G06Q 10/06
700/291
8,919,112 B1 * 12/2014 Fong ....................... F01K 25/06
60/398

(Continued)

OTHER PUBLICATIONS

R. Bianchini, Leveraging renewable energy in data centers: present and future, Jun. 2012, 2 pages.*

(Continued)

Primary Examiner — Thuy Dao
(74) Attorney, Agent, or Firm — Platinum Intellectual Property LLP

(57) ABSTRACT

The present invention relates to a monitoring and controlling system and method for megawatt level battery energy storage power plant, which includes: a central monitoring and controlling module is used to determine the power command value of each energy storage substation of the battery energy storage power plant, and send it to all the local monitoring and controlling modules; the local monitoring and controlling modules is used to calculate the power command value of each energy storage unit of the energy storage substations controlled by it, and sending it to each energy storage unit, (Continued)

and upload to the central monitoring and controlling module to store. Between the central monitoring and controlling module and the local monitoring and controlling modules, the data transmission and communication are carried out through communication networks; the communication networks adopt real time and non real time communication parallel network structure.

8 Claims, 2 Drawing Sheets

(51) Int. Cl.
*H02J 3/32* (2006.01)
*H02S 10/20* (2014.01)
*G05B 13/04* (2006.01)

(56) References Cited

U.S. PATENT DOCUMENTS

| | | | |
|---|---|---|---|
| 9,287,710 B2* | 3/2016 | Talkin | G06Q 50/06 |
| 9,331,511 B2* | 5/2016 | Becker | H02J 3/32 |
| 9,514,428 B2* | 12/2016 | Steven | G06Q 10/06314 |
| 9,548,619 B2* | 1/2017 | Gazit | H02J 7/0018 |
| 2013/0226360 A1* | 8/2013 | Wilkins | G06F 1/26 |
| | | | 700/295 |
| 2014/0114850 A1* | 4/2014 | Forbes, Jr. | G05D 17/00 |
| | | | 705/40 |
| 2015/0002100 A1* | 1/2015 | Kudo | H02J 3/32 |
| | | | 320/134 |

OTHER PUBLICATIONS

E. Gelenbe, Energy packet networks: smart electricity storage to meet surges in demand, Mar. 2012, 7 pages.*

* cited by examiner

MONITORING SYSTEM AND METHOD FOR MEGAWATT LEVEL BATTERY ENERGY STORAGE POWER PLANT

RELATED APPLICATIONS

This application is a United States National Stage Application filed under 35 U.S.C 371 of PCT Patent Application Serial No. PCT/CN2013/085410, filed Oct. 17, 2013, the disclosure of all of which are hereby incorporated by reference in their entirety.

FIELD OF THE INVENTION

The invention relates to the smart grid and energy storage and transmission field. In particular, it relates to a monitoring and controlling system and method for megawatt level battery energy storage power plant, which is suitable for monitoring and management of large-scale battery energy storage system.

BACKGROUND OF THE INVENTION

National Wind/Photovoltaic/Energy Storage and Transmission Demonstration Project (NWPESTDP) is the first batch pilot project of State Gird Corp building large scale smart gird, which is characterized by "Advanced, Flexible, Demonstrate, economics", and aimed by "grid friendly" new energy power generation. At present, it is the largest renewable energy demonstrate project in this world which has integrated wind power, photovoltaic power generation, collection, energy storage and transmission. The phase I project plans to build 100 MW wind power, 40 MW photovoltaic power and 20 MW energy storage device (including 14 MW lithium ion battery energy storage system and 2 MW redox flow battery energy storage system).

With the development of battery and its integrated technology, large scale distributed and centralized battery energy storage station will gradually become a preferred scheme. With the use of lots of energy storage stations in the distribution network terminal, the monitoring scope of energy storage device is wider, and monitoring requirements are higher. There must be a complete, scalable, standard information platform to support real-time monitoring and protection of energy storage power station in the distribution network terminal to realize the accurate, real, timely monitoring, and make the correct analysis and effective measures.

Comparing previous traditional power monitoring system with the new energy power generation system management and monitoring platform, it is easy to find that remote signals and communication data have increased sharply due to lots of batteries in the large-scale battery energy storage power plant. Therefore, in order to solve the problem in the power station management and monitoring, a system for high-speed communication, high reliability, large database capacity, integrated control and monitoring software and hardware platform for high speed real-time response characteristics in distribution network terminal energy storage power station is needed, to provide comprehensive and effective technique support for monitoring and protection of battery energy storage power station in the distribution network terminal.

To ensure the reliability and stability, an energy storage power station monitoring system must meet the performance requirements of distribution network end users real-time scheduling and control, as well as energy storage system requirements of the high speed response network for various application scenarios, which has brought enormous challenge for the monitoring system of research and development. The monitoring system structure, the communication network optimization, hardware support system development, real-time response man-machine interface design and other aspects are all facing considerable problems and constraints.

The present technologies are limited in the large-scale battery energy storage power station monitoring and grid operation, which needs further research and development.

SUMMARY OF THE INVENTION

Figure 1:
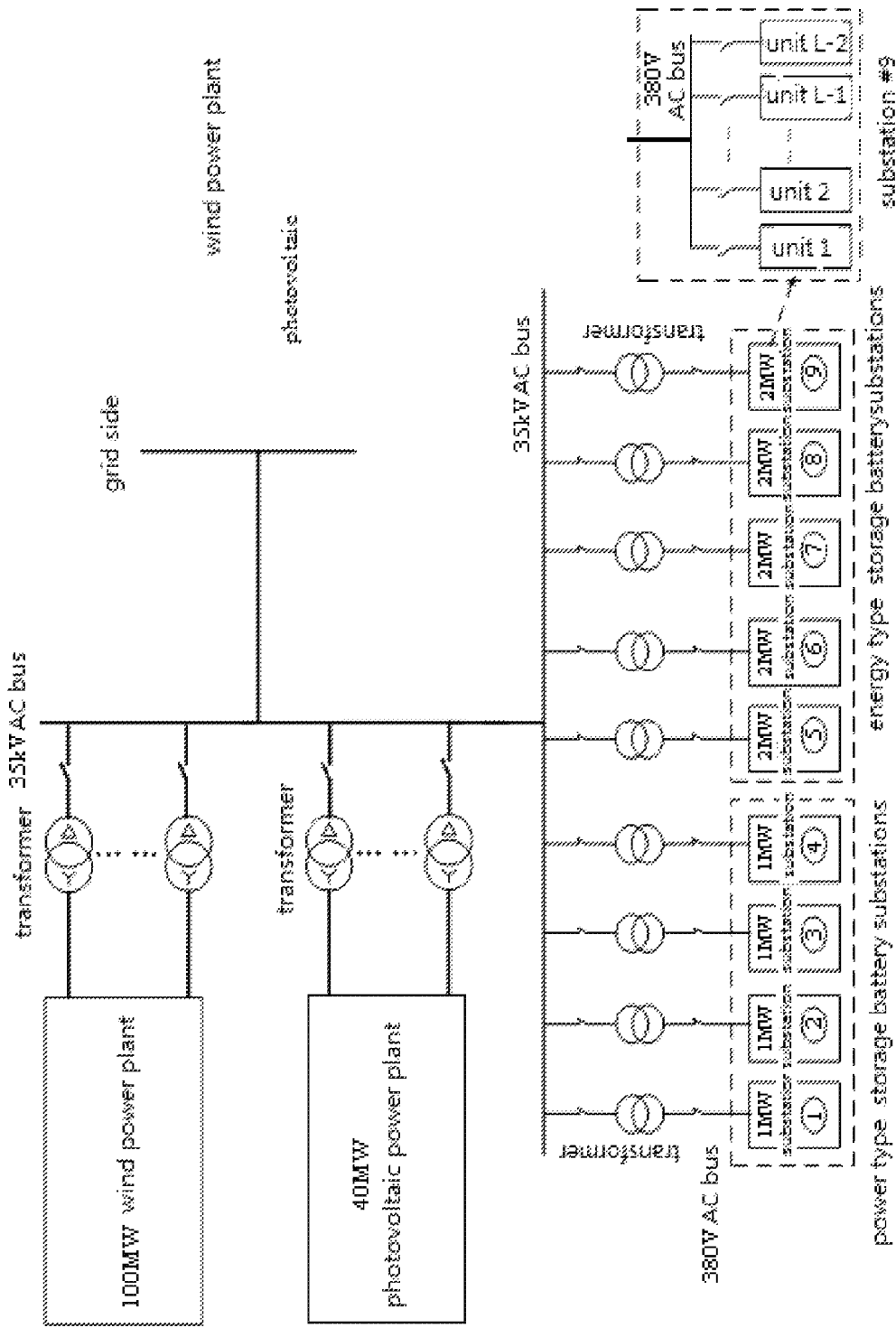
FIG. 1 is the schematic diagram of system interconnection of the multi type lithium battery energy storage power plant of the invention.

To overcome the technical defaults of the prior art, the objective of the present invention is to provide a more security and stability monitoring system of megawatt battery of the power station, which can not only meet requirements for cluster real-time and quick control and massive data transmission monitoring, but also minimize deterioration of battery and ensure the battery health run.

The monitoring system of MW batteries energy storage station is realized through the following technical scheme:

A monitoring and controlling system for megawatt level battery energy storage power plant includes:

A central monitoring and controlling module is used to determine the power command value of each energy storage substation of the battery energy storage power plant, and to send it to all the local monitoring and controlling modules;

The local monitoring and controlling modules is used to calculate the power command value of each energy storage unit of the energy storage substations, and to send realtimely it to each unit, and to upload it to the central monitoring and controlling module;

Between said central monitoring and controlling module and said local monitoring and controlling modules, the data transmission and communication are carried out through communication networks, said communication networks adopt real time and non real time communication parallel network structure.

In which, the battery energy storage power plant related data include real-time data transmission through the real-time communication network and the non-real-time data transmission through monitoring communication networks; said real-time data include upper scheduling data, wind and photovoltaic power generation data and all storage units real-time data, said non-real-time data include all storage units non-real-time data, specifically:

The upper scheduling data include any below data: tracking program power generation curve value, system load curve value, peak shaving curve value, system frequency regulation command power, battery energy storage plant total demand power, battery energy storage plant load power and wind and photovoltaic total power and so on;

The wind and photovoltaic power generation data include any below data: wind/photovoltaic generation smooth aim value, wind/photovoltaic generation fluctuation rate value, wind/photovoltaic generation total power, wind/photovoltaic generation program power; active power of each wind generator unit of the wind power plant, working state of each wind generator unit, the total power value of wind power, the rated power of wind power, predictive power of wind power and active power of each photovoltaic generator unit of the photovoltaic power plant, working state of each photovoltaic generator unit, the total power value of photovoltaic power, the rated power of photovoltaic power, predictive power of photovoltaic power, etc.;

The energy storage unit real time data include any below data: the rated power of energy storage unit, the actual power of energy storage unit, the status information (such as: controllable signals, work status, alarm status, protection status, setting status, etc.), the work mode, the available charge capacity, the available discharge capacity, the maximum allowable charging power, the maximum allowable discharge power, charge state value, discharge status values, health status values and the actual total power of battery energy storage station (equal to the sum value of all storages unit actual power), etc.;

The energy storage unit non real time data include any below data: voltage information, temperature information and non real time statues information of each battery of the storage unit, etc.

Another objective of the present invention is to provide a monitoring and controlling method for megawatt level battery energy storage power plant, and it includes following steps:

Step A. The central monitoring and controlling module reads the data of the battery energy storage power plant through the communication network, and storages and manages above data, said the communication network adopts real time and non real time communication parallel network structure;

Step B. Determining the total power demand of the battery energy storage power plant according to the central monitoring and controlling module;

Step C. Determine all the power demand values of the energy storage substation of the battery energy storage power plant, and send to all the local monitoring and controlling modules according to the central monitoring and controlling module;

Step D. Calculating all the power command values of the energy storage units of the energy storage substation, and sending it to the energy storage units according to the local monitoring and controlling module; at the same time, calculating the controllable status and charge status etc. of the energy storage substations; slave station Step E. Sending all the power command values, current controllable state of storage energy slave station, charge state, real time data and non real time data of the energy storage units that are saved temporary in the local monitoring and controlling module to the central monitoring and controlling module to storage and mange through the communication network.

In said step A, first reading the data of the battery energy storage plant through the communication network; then store the relevant data of the battery energy storage plant, and the relevant data are assigned to the corresponding interface variables.

In said step B, according to the actual need to select the appropriate calculation method to calculate or directly read the total power demand battery energy storage station issued from the external dispatch center.

In said step C, according to the current total power requirement sign of battery energy storage power station calculate real timely the command power of each energy storage slave station of the battery energy storage power station through controllable signal of slave stations, total demand power of the battery energy storage power station and the charge and discharge status values of the energy storage substations.

In said step D, according to energy storage substation power command value sign, deciding to choose the maximum allowable discharge power or charging power to calculate decision variable of each energy storage unit, and then calculate the power command value of each storage unit; and judging whether each energy storage unit meets the constraints of the maximum allowable discharge power or allowable charge power or not, if the storage units violating corresponding constraints, recalculate the power command value through the maximum allowable discharge power or the maximum allowable charge power of the storage units; or ending the judgment.

In said step E, Sending all the energy storage units power command values and real time data that are saved temporary in the local monitoring and controlling module to the central monitoring and controlling module to storage and mange through the real time communication network; and sending the non real time data of the energy storage units that are saved temporary in the local monitoring and controlling module to the central monitoring and controlling module to storage and mange through the non real time communication network;

Compared with the prior art, the advantages of the present invention are:

1) The monitoring system and method of the invention adopts both real-time communication network and non real time monitoring communication networks coexist, which meets the requirements to cluster real-time control and hundreds of thousands of energy storage batteries state monitoring, and minimizes the deterioration of battery, and ensures the healthy operation of the battery to battery energy storage power station more security and stability;

2) The monitoring system and method of the invention calculates data of the battery energy storage station through the central power management module, and realizes collective access of the battery energy storage units, real time scheduling management and multi-level coordination safety control in the integrated large-scale energy storage system through the static, dynamic and multi angle MW battery energy storage power plant on-line monitoring and power management in order to solve the battery energy storage power plant coordination control and power management problems; in addition, the monitoring system and method of the invention supports variety advanced functions of large-scale battery energy storage power plants like the smooth wind/photovoltaic power output, tracking program power generation, participation system frequency regulation, peak shaving, security and stability control and others, so it has wide application.

DETAILED DESCRIPTION OF EMBODIMENTS

The detail of the embodiments is described as below incorporated with the figures by way of cross-reference for the monitoring system and method provided by the present invention.

FIG. 1 the system topology diagram of the 14 MW lithium battery energy storage power plant located in Zhangbei NWPESTDP plant. As FIG. 1 shown, the wind and photovoltaic joint power generation system to which the battery energy storage power station is inserted includes wind power plant, photovoltaic power plant, battery energy storage power plant and the grid. The wind power plant, photovoltaic power plant and battery energy storage power plant are connected with the gird, respectively. The internal connection diagram of the wind power plant and that of photovoltaic power plant are omitted here. In this example, 14 MW lithium battery energy storage power station comprises 9 parallel connected lithium battery energy storage substations; each battery energy storage substation is connected to 35 kV AC bus through a transformer. Each lithium battery energy storage substation comprises a plenty of parallel connected lithium battery energy storage units, and each storage unit includes a bidirectional converter and a lot of lithium ion batteries, and lithium ion batteries switching control and charging and discharging power commands can be performed through the bidirectional converter.

Figure 2:
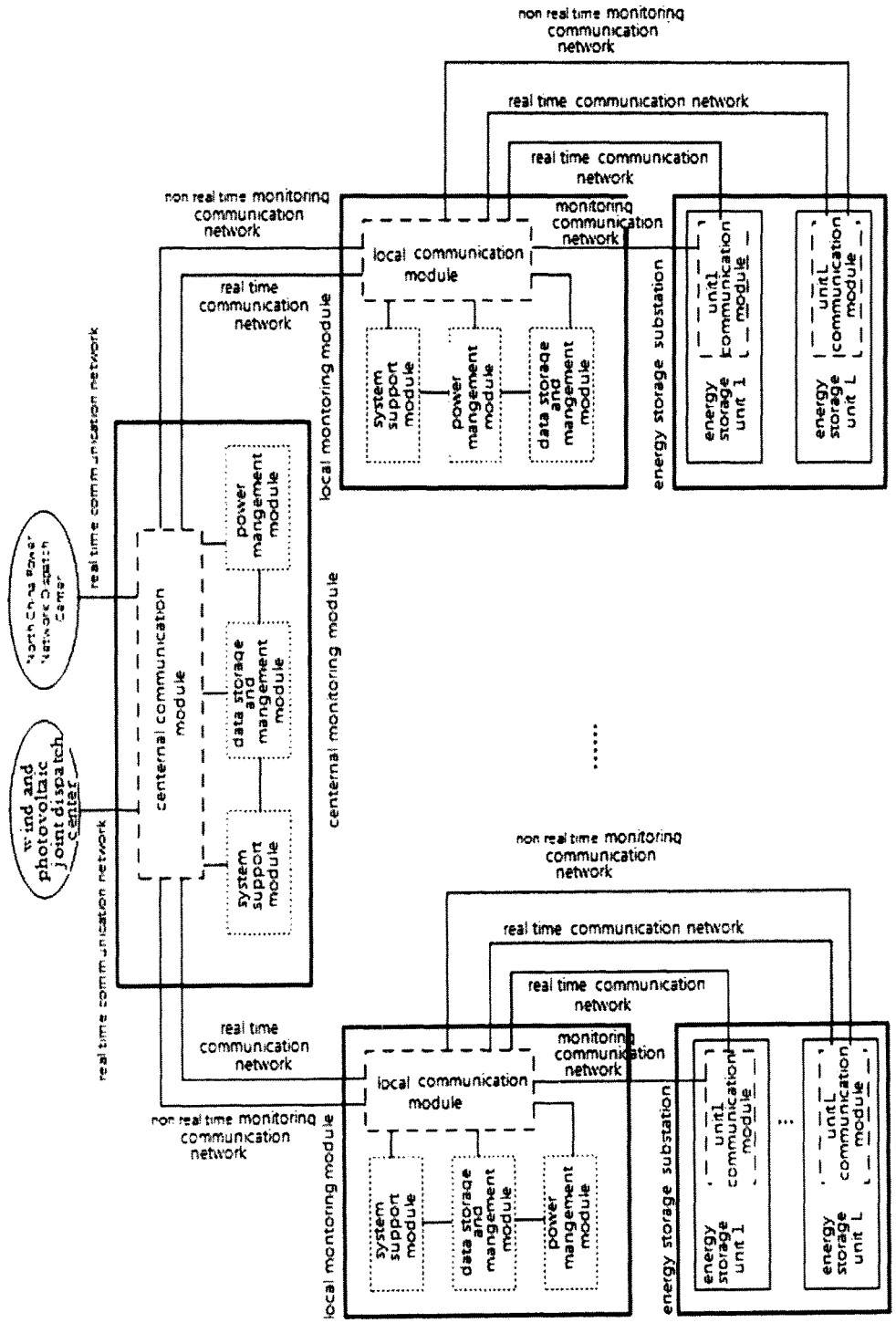
FIG. 2 is the frame diagram of the implement of the MW battery energy storage power plant monitoring system and method of the invention.

FIG. 2 is the schematic structural diagram of the monitoring system used for monitoring battery energy storage stations FIG. 1 Shown. As FIG. 2 Shown, in this example, the battery energy storage station monitoring system comprises: a central monitoring and controlling module, and a local monitoring and controlling module. Between said central monitoring and controlling module and said local monitoring and controlling modules, the data transmission and communication are carried out through communication networks, said communication networks adopt real time and non real time communication parallel network structure.

(1) The Central Monitoring and Controlling Module

This module is used to determine the power command value of each energy storage substation of the battery energy storage power plant, and sends it to all the local monitoring and controlling modules; In addition, This module is also used to monitor and process all controlling data of the energy storage power plants, implement data communications, and energy storage power station running supervision and other functions. The central monitoring and controlling module includes mainly a central support module, a central power management module, a central storage module, and a central communication module, in which, 1A) the central system support module is used to read the data of the battery energy storage plant, and sends it to central storage module; This module central support module further includes The central acquisition module: used to read relevant data of the battery energy storage power station;

The central timing module: being used to provide timing and frequency accuracy by hardware timestamp; and The central interface unit: being used to provide a variety of interface functions required by the battery energy storage power station, in addition, it also includes basic application packages, user programs and utilities etc.

1B) the central power management module, the module can be configured a variety of advanced applications according to the actual needs, used to calculate real timely total power demand of the battery energy storage plant and determine the power command value of each energy storage unit of the power plant according to specific application, and send to central storage module, for the realization of power management of the battery energy storage station, and a variety of battery energy storage power station specific applications (a variety of applications including smooth wind power output, tracking generation plan, system frequency regulation participation, peak shaving, security and stability control, etc.), and through real-time information exchange to realize the entire energy storage real-time status monitoring and alert functions. The central power management module further comprises:

Smooth wind/photovoltaic power output module: which uses adaptive filtering techniques and feedback control to stabilize wind/photovoltaic power output fluctuations. Namely, introduces the SOC and feedback control of wind/photovoltaic power output fluctuation rate to smooth fluctuations in wind/photovoltaic power output fluctuations. Smooth wind/photovoltaic power output modules calculates in real time the total demand power of battery energy storage station need to smooth fluctuations according to the current feedback SOC and the wind/photovoltaic power output fluctuation rate, and also calculates the battery energy storage power station current working capacity, in order to meet smooth wind/photovoltaic power output requirement, and control effectively the SOC and power fluctuation rate within the set range.

Tracking program power generation module: which is used to real-time compensate difference between the actual power of the wind/photovoltaic co-generation and the plan power. Tracking program generation module calculates real-time total power demand of the battery energy storage power station required by tracking program according to the feedback value of the current battery status and remaining battery capacity, and also calculates the current work ability of the battery energy storage power station.

System frequency regulation module: which is used to meet real-time system frequency regulation command power to support AGC issued by external dispatch center (including upper scheduling and North gird) directly. System frequency regulation module calculates real-time total power demand of the battery energy storage power station required by system frequency regulation according to the feedback information of system frequency regulation command power, and current battery status and remaining battery capacity, and also calculates the current work ability of the battery energy storage power station.

Peak shaving module: which is used to meet real-time system frequency regulation command power of the storage station for peak shaving issued by external dispatch center. That is real timely responds the command power issued by upper scheduling to ensure the effect of the peak shaving. Peak shaving module calculates real-time total power demand of the battery energy storage power station required for peak shaving according to the feedback of the current battery status and remaining battery capacity, and also calculates the current active and reactive work ability of the battery energy storage power station (such as: the current available capacity and the maximum allowable charge and discharge capability).

Security and stability control module: it calculates real-time total power demand of the battery energy storage power station required for security and stability control according to the security and stability control commands and relevant energy storage power demand issued by external dispatch center, and current status information of each unit, and also calculates the current active and reactive work ability of the battery energy storage power station (e.g.: the current available capacity and the maximum allowable charge and discharge capability) to ensure system real time power needs, and ensure the energy storage station normal, safe, reliable work;

Energy storage power station total power demand real-time allocation module: which is used to calculate the power command value of each energy storage substation according to the battery energy storage need total power computed by any above said module calculation or the external dispatch center sends directly and the acquired current information of each storage unit (e.g.: the battery work status, the current total energy storage capacity, and the maximum charge and discharge capability, battery voltage, SOH and temperature, etc.), and avoid battery over charge and discharge while ensuring the total power demand of the battery energy storage station.

Data process module: which is used to read the real time data that is transmitted through the central real time communication module, and send the data to smooth wind/photovoltaic power output module, tracking program generation module, system frequency regulation module, peak shaving module, security and stability control module, or energy storage power station total power demand real-time allocation module to compute, and then send the calculation results to the central real time communication module and the central storage module for united storage and management.

1C) A central storage module, it is used to store relevant data of the battery storage station and mange each storage substation. It is used to storage the data of battery energy storage and the power command value of each energy storage substation, and gives the data and the power command values to corresponding interface variables for the local central monitoring and controlling module and external dispatch center to call.

1D) A central communication module, which includes central real time communication module and central non real time communication module, said central real time communication module communicates real time with the local monitoring and controlling module and external dispatch center through real time communication network; said central non real time communication module communicates with the local monitoring and controlling module and external dispatch center through non real time communication network.

(2) The Local Monitoring and Controlling Module

Each local monitoring and controlling module is used to monitor a corresponding storage substation, and this module is used to calculate all the power demand values of the energy storage units of the energy storage substation, and send to the energy storage units according to the local monitoring and controlling module, and send all the power command values of the energy storage units to the central monitoring and controlling module to storage.

In addition, the module real-timely communicate with storage units of the storage substations through the local real-time communication module to collect and process the local data, and monitor the local storage converters power distribution, self-diagnosis and protection functions of the local energy storage devices, etc. The local monitoring and controlling module further comprises:

2A) The local system support module, which is used to read power command values of the battery energy storage substations and real time, non real time data of all energy storage units, and sends it to the local storage module; The local system support module further comprises:

The local acquisition module: which is used to read relevant data of the battery energy storage power station.

The local timing module: which is used to provide timing and frequency accuracy by hardware timestamp; and The local interface unit: which is used to provide a variety of interface functions required by the energy storage units of the substations, in addition, it also includes basic application packages, user programs and utilities etc.

2B) The local power management module, which is used to calculate all the power command values of the energy storage units of the energy storage substations, and sends the power demand values to the corresponding energy storage units, to achieve storage units power management of the energy storage substation, diagnostics and protection and control functions of the energy storage substation.

2C) The local storage module, which is used to temporary storage power command value of the energy storage substation, and all the power command values, real time data, and non real time data of the energy storage units; And sends the all of the power command values and real time data of the energy storage units to the real time central communication module, and sends the all non-real-time data of the energy storage units to the central non-real-time communication module, and using the central storage module for unified storage and management; when external dispatch center need to retrieve, transmit command power of each storage unit and the real-time data through a central real-time communication module and transmit the non-real-time data of each storage unit through a central non-real-time communication module.

2D) The local communication module, which includes local real time communication module and local non real time communication module, said local real time communication module communicates real time with the central monitoring and controlling module and all of energy storage units through real time communication network, said local non real time communication module communicates with the central monitoring and controlling module and all of the energy storage units through non real time communication network.

As FIG. 2 shown, the monitoring and controlling method for megawatt level battery energy storage power plant provided by this invention, it includes some steps as follows:

Step A. The central monitoring and controlling module reads the data of the battery energy storage power plant through the real-time and non real time central communication network, and stores and manages above data through the central storage module of the central monitoring and controlling module.

Step B. Determining the total power demand of the battery energy storage power plant according to the central power management module of the central monitoring and controlling module.

Step C. Determining all the power command values of the energy storage substation of the battery energy storage power plant according to the central power management module, and send real timely to all the local monitoring and controlling modules through central real time communication module.

Step D. Calculating all the power command values of the energy storage units of the energy storage substation according to the local power management module of the local monitoring and controlling module, and send real timely to the energy storage units through local real time communication module; and this module calculates the current controllable status, charge status and etc. of the jurisdiction storage substations.

Step E. The real time and non real time data of each storage unit and command power of each storage unit, the current controllable status, charge status and etc. of the jurisdiction storage substations calculated in step D will be saved temporarily in the local storage module of the local monitoring and controlling module, and then the real time data and command power of the energy storage units will be uploaded to the central real time communication module through the local real-time communication module, and the non real time data of the energy storage units will be uploaded to the central non real time communication module through the local non real-time communication module, and unified storage and management in the central storage module.

When the external dispatch center needs to read data, based on the communication protocol, the corresponding information of the storage power station will be uploaded to the external control center through the central real-time, non real time communication module.

Data exchange between each of the above steps can adopt the following communication mode:

1) The real-time communication between the local real-time communication module in said step D and the central real-time communication module in said step C can be achieved though real-time communication network based on the EPA (Ethernet for Plant Automation) or PROFINET real-time Ethernet communication protocol.

2) The real-time communication between the local real-time communication module in said step D and the energy storage units can be achieved though real-time communication network based on the EPA (Ethernet for Plant Automation) or PROFINET real-time Ethernet communication protocol.

3) The non real-time communication between the central non real-time communication module in said step E and the local real-time communication module can be achieved though monitoring network based on the IEC104 communication protocol.

4) When the external dispatch center (e.g., as shown in FIG. 2, wind and photovoltaic joint dispatch center and North China Power Network Dispatch Center) needs to obtain data from the central monitoring and controlling module, the real-time communication between the central communication module and the external dispatch center can be achieved though real time communication network based on the IEC104 communication protocol.

In step A, the central storage module is used for data storage of the battery energy storage power station, and manages the data, namely: the data of the battery energy storage power station is assigned to a relevant interface variables according to the set protocol, for the call of the local monitor module and the external dispatch center.

The relevant data of said battery energy storage power station consists of the real-time data transmission through real-time communication network and non real time data and the non real time transmission data through monitoring communication network; said real-time data include upper scheduling data, wind and photovoltaic power generation data and all storage units real-time data, said non-real-time data include all storage units non-real-time data:

Energy storage power station monitoring interface set data includes the filter time constant, wind and photovoltaic power generation volatility index, energy storage power station set application mode (e.g., 1: smooth wind and photovoltaic power output mode, 2: tracking power plan mode; 3: system frequency regulation frequency mode, 4: peak shaving mode, 5: security and stability control mode) etc.

The upper scheduling data includes any below data: tracking program power generation curve value, system load curve value, peak shaving curve value, system frequency regulation command power, battery energy storage plant total demand power, battery energy storage plant load power and wind and photovoltaic total power and so on.

The wind and photovoltaic power generation data includes any below data: wind/photovoltaic generation smooth aim value, wind/photovoltaic generation fluctuation value, wind/photovoltaic generation total power, wind/photovoltaic generation program power; active power of each wind generator unit of the wind power plant, working state of each wind generator unit, the total power value of wind power, the rated power of wind power, predictive power of wind power and active power of each photovoltaic generator unit of the photovoltaic power plant, working state of each photovoltaic generator unit, the total power value of photovoltaic power, the rated power of photovoltaic power, predictive power of photovoltaic power, etc.

The real time data of the energy storage assembling unit includes any below data of it: the rated power, the actual power, the status information (such as: controllable signals, work status, alarm status, protection status, setting status, etc.), the work mode, the available charge capacity, the available discharge capacity, the maximum allowable charging power, the maximum allowable discharge power, charge state value, discharge status values, health status values and the actual total power of battery energy storage station (equal to the sum value of all storages unit actual power), etc.

The non real time data of the energy storage assembling unit includes any below data: voltage information, temperature information and non real time statues information of each battery of it, etc.

In step B, the total power demand of the battery energy storage station can be obtained by anyone method of the following:

B1) the total power demand of the battery energy storage to output smooth wind/photovoltaic fluctuation is computed by the following formulations:

$$P_{ES}^{TM} = P_{SWP}^{TV} - P_{TWP} \qquad (1)$$

Where, $$P_{SWP}^{TV} = \frac{1}{1 + sT_F} P_{TWP} \qquad (2)$$

$$P_{TWP} = P_{TW} + P_{TP} \qquad (3)$$

$$T_F = \begin{cases} T_1 & \text{if } r_F \leq \delta_1 \\ T_2 & \text{if } \delta_1 < r_F \leq \delta_2 \\ T_3 & \text{if } r_F > \delta_2 \end{cases} \qquad (4)$$

$$r_F = f\left(\frac{P_{TWP}^{Max} - P_{TWP}^{Min}}{P_{TWP}^{R}}\right)_T \qquad (5)$$

$$P_{TWP}^{Max} = \text{Max}(P_{YWP})_T \qquad (6)$$

$$P_{TWP}^{Min} = \text{Min}(P_{YWP})_T \qquad (7)$$

In which, $P_{SWP}^{TV}$ is the target value of smooth generation power; $P_{TWP}$ is total power of the wind and photovoltaic generation; $P_{TW}$ is total power of the wind generation; $P_{TP}$ is total power of the photovoltaic generation; $T_F$, $T_1$, $T_2$ and $T_3$ are all filtering constants, and $T_1 < T_2 < T_3$; $r_F$ is fluctuation rate of the wind and photovoltaic power; S is complex variables; T is fluctuation rate calculating time; $\delta_1$ and $\delta_2$ are all filtering rate index of the wind and photovoltaic generation, and $\delta_1 < \delta_2$, $P_{TWP}^{Max}$, $P_{TWP}^{Min}$, $P_{TWP}^{R}$ are the max, min and rated power of the wind and photovoltaic total power within T time, respectively, and the rated power is the sum of wind and photovoltaic power, and it can be expressed by following formulation:

$$P_{TWP}^R = \sum_{k=1}^{W} u_{Wk} P_{Wk}^R = \sum_{k=1}^{V} u_{Pk} P_{Pk}^R \qquad (8)$$

In above formulation, $P_{Wk}^R$ is rated power of the wind assembling unit k; $u_{Wk}$ is controllable state of the wind assembling unit k, when the wind assembling unit k is controllable, the state value is 1, otherwise value is 0; W is the number of the wind assembling unit; $P_{Pk}^R$ is rated power of the photovoltaic assembling unit k; $u_{Pk}$ is controllable state of the photovoltaic assembling unit k, when the wind assembling unit k is controllable, the state value of it is 1, otherwise value of it is 0; V is the number of the photovoltaic assembling unit.

B2) According to the current work status and the battery capacity feedback of each storage assembling unit, the real timely the total power demand of battery energy storage station for tracking program to be calculated:

Firstly, the wind/photovoltaic generation plan value be determined each time interval (i.e. scale) according to wind/photovoltaic generation curve which is automatically formed by computer basing on it each time internal.

Secondly, according to the wind/photovoltaic generation plan value, determining the current total power $P_{SWP}$ of the wind/photovoltaic energy storage generation by following formulations:

$$P_{SWP} = P_{SWP}^{AP} + k\Delta t \qquad (9)$$

$$k = \frac{P_{SWP}^{NP} - P_{SWP}^{AP}}{T_{TC}} \qquad (10)$$

Thirdly, by the calculated $P_{SWP}$, determining the total power demand of the battery energy storage $P_{ES}^{TM}$ according to the formulation:

$$P_{ES}^{TM} = P_{SWP} - P_{TW} - P_{TP}. \qquad (11)$$

At last, judging and correcting the $P_{ES}^{TM}$ by following method, and get the total tracking program power demand of battery energy storage station:

If $P_{ES}^{TM} > 0$, and $P_{ES}^{TM} > P_{ES}^{MAD}, P_{ES}^{TM} = P_{ES}^{MAD}$; and If $P_{ES}^{TM} < 0$, and $|P_{ES}^{TM}| > |P_{ES}^{MAC}|, P_{ES}^{TM} = P_{ES}^{MAC}$ In above formulation, $P_{SWP}$ is the wind and photovoltaic total generation power; $\Delta t$ is control cycle which is determined according to real control demand, e.g., $\Delta t=1$ or 2 s.; $P_{SWP}^{AP}$ and $P_{SWP}^{NP}$ are wind and photovoltaic plan power at this time and next time, respectively; $P_{ES}^{MAC}$ and $P_{ES}^{MAD}$ are the maximum allowable charge power and the minimum allowable discharge power, respectively.

B3) According to the system frequency regulation command power and current battery status and remaining battery capacity feedback of each storage unit, to calculate real timely the total power demand of battery energy storage station for system frequency regulation:

(1) Read system frequency regulation power command value $P_{ES}^{AGC}$; When the sign of $P_{ES}^{AGC}$ is positive, it indicates that the battery energy storage station is discharge state, calculates the total power demand $P_{ES}^{TM}$ of it used for frequency regulation, according to the maximum allowable discharge power of current it.

Firstly judge whether $P_{ES}^{AGC}$ satisfies the maximum allowable discharge power constraints:

$$P_{ES}^{AGC} \leq P_{ES}^{MAD}, \qquad (12)$$

If violating the condition (12), $$P_{ES}^{TM} = P_{ES}^{MAD}, \qquad (13)$$

Otherwise, $$P_{ES}^{TM} = P_{ES}^{AGC} \qquad (14)$$

(2) When the command value $P_{ES}^{AGC}$ of system frequency regulation power is negative, it indicates that the battery energy storage station is charge state, according to the maximum allowable charge power of current battery energy storage station, calculate total power demand $P_{ES}^{TM}$ of batter store energy station used for frequency regulation.

Firstly judge whether $P_{ES}^{AGC}$ satisfies the maximum allowable charge power constraints:

$$|P_{ES}^{AGC}| \leq |P_{ES}^{MAC}|, \qquad (15)$$

If violating the condition (15), $$P_{ES}^{TM} = P_{ES}^{MAC} \qquad (16)$$

Otherwise, $$P_{ES}^{TM} = P_{ES}^{AGC} \qquad (17)$$

B4) According to the current work battery status and remaining battery capacity feedback of each storage unit, calculating real timely the total power demand of battery energy storage station for peak shaving:

Firstly, read the peak shaving curve value $P^{AP}$ and system load curve value $P_L$ at present, and determining the total power demand $P_{ES}^{TM}$ of the battery energy storage station at this time by following formulation:

$$P_{ES}^{TM} = P^{AP} - P_L \qquad (18)$$

Secondly, judge and correct the $P_{ES}^{TM}$ by following method, and get the total peak shaving power demand of battery energy storage station:

If $P_{ES}^{TM} > 0$, and $P_{ES}^{TM} > P_{ES}^{MAD}, P_{ES}^{TM} = P_{ES}^{MAD}$;

If $P_{ES}^{TM} < 0$, and $|P_{ES}^{TM}| > |P_{ES}^{MAC}|, P_{ES}^{TM} = P_{ES}^{MAC}$ In formulation (18), $P^{AP}$ is timely changed, $P_L$ is the system load curve value, and update each acquisition period; and $P^{AP}$ is the peak shaving power, and update each time.

B5) According to the current status information of each storage unit, calculating real timely the total power demand of battery energy storage station:

$$P_{ES}^{TM} = P_{ES}^{MAD} \qquad (19)$$

B6) Read directly the total power of the battery energy storage station need that is sent by external dispatch center.

In step C, the specific method to determine all the power command values of said the energy storage substation of the battery energy storage power plant is as below:

When $P_{ES}^{TM}$ got in step B is positive, $$P_{substationi} = \frac{u_{substationi} SOC_{substationi}}{\sum_{i=1}^{S}(u_{substationi} SOC_{substationi})} P_{ES}^{TM} \qquad (20)$$

If there is any substation i power demand values $P_{substationi}$ that can satisfies $P_{substationi} > 0$ and $P_{substationi} > P_{substationi}^{MAD}$, re-determine $P_{substationi}$ according to following formulations:

$$P_{substationi} = \frac{u_{substationi} P_{substationi}^{MAD}}{\sum_{i=1}^{S}(u_{substationi} P_{substationi}^{MAD})} P_{ES}^{TM} \quad (21)$$

$$P_{substationi}^{MAD} = \sum_{k=1}^{L} u_k P_k^{MAD} \quad (22)$$

When $P_{ES}^{TM}$ got in step B is negative, $$P_{substationi} = \frac{u_{substationi} SOD_{substationi}}{\sum_{i=1}^{S}(u_{substationi} SOD_{substationi})} P_{ES}^{TM} \quad (23)$$

If there is any substation i power demand values $P_{substationi}$ that can satisfies $P_{substationi} < 0$ and $|P_{substationi}| > |P_{substationi}^{MAC}|$, re-determine $P_{substationi}$ according to following formulations:

$$P_{substationi} = \frac{u_{substationi} P_{substationi}^{MAC}}{\sum_{i=1}^{S}(u_{substationi} P_{substationi}^{MAC})} P_{ES}^{TM} \quad (24)$$

$$P_{substationi}^{MAC} = \sum_{k=1}^{L} u_k P_k^{MAC} \quad (25)$$

In above formulations, $u_{substationi}$ is controllable state of the substation i. When it is controllable state, $u_{substationi}=1$, the rest value is zero; $SOC_{substationi}$ is charge state value of the substation i; $SOD_{substationi}$ is discharge state value of the substation i, $SOD_{substationi}=1-SOC_{substationi}$; S is the number of the substation; $P_{ES}^{TM}$ is total power demand of the battery energy storage power plant; $P_{substationi}$ is total power demand of the substation i; $P_{substationi}^{MAD}$ is the maximum allowable discharge power of the substation i; $P_{substationi}^{MAC}$ is the maximum allowable charge power of the substation i; $P_k^{MAD}$ is the maximum allowable discharge power of energy storage unit k; $P_k^{MAC}$ is the maximum allowable discharge power of energy storage unit k.

In step C, when calculate the storage substations current controllable status and charge status value: (1) according to the current controllable status of each unit to calculate the storage substations current controllable status value; (2) according to the current controllable status and charge status of each unit to calculate current charge status value of the distribution substation;

In particular, the storage substations current controllable status and charge status value can be obtained by following method:

1) For $u_{substationi}$: when any unit of the substation i is controllable, $u_{substationi}=1$, or $u_{substationi}=0$;

2) For $SOC_{substationi}$: $SOC_{substationi} = \left(\sum_{k=1}^{L} u_k SOC_k\right) / \sum_{k=1}^{L} u_k$, L is the number of the substation i; $u_k$ is the controllable status value of unit k of the substation i; When the unit k is controllable, the value is 1, or it is 0.

In step D, the command power of each unit of the substations can be got by following method:

Step D1. When the command power $P_{substationi}$ of the energy storage substation i is positive, the storage substation will be in discharges status, the method to calculate the command power $P_i$ of each units of the energy storage substation includes following steps based on the State of Charge (SOC) and the maximum allowable discharge power:

D11) Calculating each decision variable $x_i$ of storage units through genetic algorithm.

(11a) Determining the individual number N (chromosome) of the group, the gene number of each chromosome is the number L of the storage unit, make binary codes (The code is a vector, i.e. chromosome. The each element is gene, whether the relevant gene value to be corresponding to each store energy unit participate the decision value of this time allocation decision value $x_i$, (i=1 . . . L)) for each individual, and a randomly generate N individuals as the initial group, obtain 0 and 1 gene cluster combination, and let evolution algebra counter value G=0;

(11b) Judge whether the evolution algebra counter value G is less than or equal to the maximum evolution generation counter value $G^{max}$ or not, and whether each individual meets the constraints of the following formula: If the above two conditions are both met, go to step 11c; Otherwise, skip to step 11f.

$$\left|\sum_{i=1}^{L}(x_i u_i \alpha_i P_i^{MAD}) - P_{Lithium}^{TM}\right| > 0 \quad (26)$$

(11c) Calculate corresponding fitness $S_k$ of each individual k based on the following formulation.

$$S_k = \left|\sum_{i=1}^{L}(x_i u_i \alpha_i P_i^{MAD}) - P_{Lithium}^{TM}\right|, \text{ where } k = 1, \ldots N \quad (27)$$

(11d) Based on the fitness value calculated in step 11c, making selection according to the principle of survival of the fittest, and then restructure and mutate according to crossover and mutation probability separately to get off springs.

(11e) Based on the following objective function (I) select the optimal offspring, and insert it into the population for substitution in accordance with the insertion probability; then let G=G+1, and return to step 11b.

$$\min f(x_1, x_2, \ldots x_L) = \min\left\{\sum_{i=1}^{L}(x_i u_i P_i^{MAD})\right\} \quad (I)$$

$$\text{s.t.} \begin{cases} \left|\sum_{i=1}^{L}(x_i u_i P_i^{MAD}) - P_{Lithium}^{TM}\right| \geq 0 \\ x_i \in \{0, 1\} \ (i = 1, 2 \ldots L) \end{cases}$$

(11f) Compute the optimal solution satisfied the objective function (I), decode the individual of the optimal solution, obtain strings arrangement of gene combinations, and the value of each gene is decision variable values $x_i$ of the corresponding storage unit i, (i=1, . . . , L).

D12) Calculate each command power $P_i$ of storage units through following formulation:

$$P_i = \frac{x_i u_i SOC_i}{\sum_{i=1}^{L}(x_i u_i SOC_i)} P_{substation\,i} \quad (28)$$

D13) judge whether the each command power $P_i$ of storage units gained after step D2 meets below storage units the maximum allowable discharge power active constraints:

$$P_i \leq P_i^{MAD} \quad (29)$$

D14) If there are any units that violate the constraints (29), perform the steps D15, or end.

D15) Re-determine each command power $P_i$ of storage units i according to following formulation:

$$P_i = \frac{x_i u_i P_i^{MAD}}{\sum_{i=1}^{L}(x_i u_i P_i^{MAD})} P_{substation\,i} \quad (30)$$

Step D2. When the command power $P_{substationi}$ of the energy storage substation i is negative, it shows that the batter storage station will be in charge statue, the method to calculate the command power $P_i$ of each units of the energy storage substation includes following steps based on the state of discharge (SOD) and the maximum allowable charge power:

D21) Calculating each decision variable $x_i$ of storage units through genetic algorithm.

(21a) Determining the individual (chromosome) number N of the group, the number of genes of each individual is the number L of the storage unit, making binary codes for each individual (The code is a vector, i.e. chromosome. The each element is gene, whether the relevant gene value to be corresponding to each store energy unit participate the decision value of this time allocation decision value $x_i$, (i=1 ... L)), and a randomly generating N individuals as the initial group, obtaining 0 and 1 gene cluster combination, and let evolution algebra counter value G=0;

(21b) Judge whether the evolution algebra counter value G is less than or equal to the maximum evolution generation counter value $G^{max}$ or not, and whether each individual meets the constraints of the following formula: If the above two conditions are both met, go to step 11c; Otherwise, skip to step 11f.

$$\left|\sum_{i=1}^{L}(x_i u_i \alpha_i P_i^{MAC}) - P_{Lithium}^{TM}\right| > 0 \quad (31)$$

(21c) Calculating corresponding fitness $S_k$ of each individual k based on the following formulation.

$$S_k = \left|\sum_{i=1}^{L}(x_i u_i \alpha_i P_i^{MAC}) - P_{Lithium}^{TM}\right|, \text{ where } k = 1, \ldots N$$

(21d) Based on the fitness value calculated in step 21c, making selection according to the principle of survival of the fittest, and then restructure and mutate according to crossover and mutation probability separately to get off springs;

(21e) Based on the following objective function (II) selecting the optimal offspring, and insert it into the population for substitution in accordance with the insertion probability; then let G=G+1, and return to step 21b.

$$\min f(x_1, x_2, \ldots x_L) = \min\left\{\sum_{i=1}^{L}(x_i u_i P_i^{MAC})\right\} \quad (II)$$

$$\text{s.t.} \begin{cases} \left|\sum_{i=1}^{L}(x_i u_i P_i^{MAC}) - P_{Lithium}^{TM}\right| \geq 0 \\ x_i \in \{0, 1\} \; (i = 1, 2 \ldots L) \end{cases}$$

(21f) Computing the optimal solution satisfied the objective function (II), decode the individual of the optimal solution, obtain strings arrangement of gene combinations, and the value of each gene is decision variable values $x_i$ of the corresponding storage unit i, where i=1, ..., L.

D22) Calculating each command power $P_i$ of storage units which participate in following plan through following formulation:

$$P_i = \frac{x_i u_i SOC_i}{\sum_{i=1}^{L}(x_i u_i SOC_i)} P_{substation\,i} \quad (33)$$

$$SOD_i = 1 - SOC_i \quad (34)$$

D23) judge whether the each command power $P_i$ of storage units gained after step D22 meets below storage units the maximum allowable charge power active constraints:

$$|P_i| \leq |P_i^{MAC}| \quad (35)$$

D24) If there are any units that violate the constraints (35), perform the steps D25, or end.

D25) Re-determine each command power $P_i$ of storage units i according to following formulation.

$$P_i = \frac{x_i u_i P_i^{MAC}}{\sum_{i=1}^{L}(x_i u_i P_i^{MAC})} P_{substation\,i} \quad (36)$$

In formulations (26)-(36), $u_i$ is controllable state of the store energy unit i, which is read through step A, when the state of store energy unit is in controllable, the state value is 1; other values are 0, and $x_i$ is 0-1 decision variable, when $x_i$=1, it represents the store energy unit to be participle in the power allocation calculating. When $x_i$=0, it is not participate in said power allocation; $SOC_i$ is charge state value of the unit i; $SOD_i$ is discharge state value of the unit i, $SOD_i$=1−$SOC_i$; L is the number of the battery store energy unit; $P_i^R$ is rated power of the unit i; $P_{substationi}$ is total power demand of the substation i; $P_i^{MAD}$ is the maximum allowable discharge power of the unit i; $P_i^{MAC}$ is the maximum allowable charge power of the unit i.

In summary, the present invention can achieve large-scale battery storage power plant system centralized access, multi-type battery system coordinated control, all kinds of battery energy storage units status monitoring and real-time fast output control functions and etc. The power management module of the energy storage power plant monitoring system has various kinds of energy storage battery power and application functions, such as battery power real-time distribution function of the energy storage power station, peak shaving function, system frequency regulation function, tracking power generation plan function, smooth power output function and stability and safety control function, which improve predictability, controllability and schedulability of the wind power and photovoltaic power generation of the large-scale energy storage power station system.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the art to understand the invention. It is intended that the scope of the invention be defined by the following claims and their equivalents.

What is claimed is:

1. A monitoring and controlling method for megawatt level battery energy storage power plant is characterized that, comprising:

step A. The central monitoring and controlling module reads the data of the battery energy storage power plant through the communication network, and stores and manages above data, said the communication network adopts real time and non real time communication parallel network structure;

step B. Determining the total power demand of the battery energy storage power plant according to the central monitoring and controlling module;

step C. Determining all the power demand values of the energy storage substation of the battery energy storage power plant according to the central monitoring and controlling module, and sending it to all the local monitoring and controlling modules;

step D. Calculating all the power command values of the energy storage units of the energy storage substation according to the local monitoring and controlling module, and sending it to the energy storage units;

step E. Sending all the power command values, real time data and non real time data of the energy storage units that are saved temporarily in the local monitoring and controlling module to the central monitoring and controlling module to storage and mange through the communication network;

the total power demand of the battery energy storage power plant can be determined by anyone as below in step B:

B1) reading wind/photovoltaic generation smooth aim value and the total power real time, and the different value to get which the latter value is subtracted from the former value is the total power demand of the battery energy storage plant the smooth wind/photovoltaic generation output fluctuation needed;

B2) reading wind/photovoltaic generation plan value real time, and determining the total power of the wind/photovoltaic energy storage generation, the power value of the wind and photovoltaic generation is subtracted from the total power value, and judge by the minus value and then adjust, get the total power demand of the battery energy storage station of tracking plan needed at present;

B3) reading system frequency regulation power command value $P_{ES}^{AGC}$, judging whether it satisfies the maximum allowed discharge power constraints or the maximum allowable charging power constraints according to the sign of $P_{ES}^{AGC}$; if the violation of the constraint conditions, taking the battery energy storage station maximum allowed discharge power or the maximum allowable charging power as system frequency regulation required total power of the battery energy storage; otherwise, $P_{ES}^{AGC}$ will be considered as system frequency regulation required total power of the battery energy storage;

B4) reading real the peak shaving curve value and system load curve value at present, and judging and re-correcting the minus value get from which the latter is subtracted from the former, and get the total power demand of the battery energy storage station of shaving peak needed at present;

B5) taking the battery energy storage station maximum allowed discharge power as the safe and stable control need total power of the battery energy storage; and B6) reading real time the total power of the battery energy storage station need that is sent by external dispatch center directly.

2. The monitoring and controlling method according to claim 1, is characterized that, in step B1, the total power demand of the battery energy storage to output smooth wind/photovoltaic fluctuation is computed by the following formulations:

$$P_{ES}^{TM} = P_{SWP}^{TV} - P_{TWP}$$

Where, $$P_{SWP}^{TV} = \frac{1}{1+sT_F} P_{TWP}$$

$$P_{TWP} = P_{TW} + P_{TP}$$

$$T_F = \begin{cases} T_1 & \text{if } r_F \leq \delta_1 \\ T_2 & \text{if } \delta_1 < r_F \leq \delta_2 \\ T_3 & \text{if } r_F > \delta_2 \end{cases}$$

$$r_F = f\left(\frac{P_{TWP}^{Max} - P_{TWP}^{Min}}{P_{TWP}^R}\right)_T$$

$$P_{TWP}^{Max} = \text{Max}(P_{YWP})_T$$

$$P_{TWP}^{Min} = \text{Min}(P_{YWP})_T$$

in which, $P_{SWP}^{TV}$ is the target value of smooth generation power; $P_{TWP}$ is total power of the wind and photovoltaic generation; $P_{TW}$ is total power of the wind generation; $P_{TP}$ is total power of the photovoltaic generation; $T_F$, $T_1$, $T_2$, $T_3$ are all filtering time constants, and $T_1<T_2<T_3$; $r_F$ is fluctuation rate of the wind and photovoltaic power; S is complex variables; T is fluctuation rate calculating time; $\delta_1$, $\delta_2$ are all filtering rate index of the wind and photovoltaic generation, and $\delta_1<\delta_2$, $P_{TWP}^{Max}$, $P_{TWP}^{Min}$, $P_{TWP}^R$ are the max, min and rated power of the wind and photovoltaic total power within T time, respectively, and the rated power is the sum of wind and photovoltaic power, and it can be expressed by following formulation:

$$P_{TWP}^R = \sum_{k=1}^{W} u_{Wk} P_{Wk}^R + \sum_{k=1}^{V} u_{Pk} P_{Pk}^R$$

in above formulation, $P_{Wk}^R$ is rated power of the wind unit k; $u_{Wk}$ is controllable state of the wind unit k, when the wind unit k is controllable, the state value is 1, otherwise is 0; W is the number of the wind unit; $P_{Pk}^R$ is rated power of the photovoltaic unit k; $u_{Pk}$ is controllable state of the photovoltaic unit k, when the wind unit k is controllable, the state value is 1, otherwise is 0; V is the number of the photovoltaic unit;

in step B2, the specific calculation steps of tracking program required total power demand of battery energy storage station include:

firstly, reading wind/photovoltaic generation plan value, and determine the total power of the wind/photovoltaic energy storage generation according to following formulations:

$$P_{SWP} = P_{SWP}^{AP} + k\Delta t$$

$$k = \frac{P_{SWP}^{NP} - P_{SWP}^{AP}}{T_{TC}}$$

secondly, reading total power of the wind $P_{TW}$ and the photovoltaic total power $P_{TP}$ at present, and determining the total power demand of the battery energy storage $P_{ES}^{TM}$ according to the formulation: $P_{ES}^{TM} = P_{SWP} - P_{TW} - P_{TP}$;

at last, judging and re-correcting the $P_{ES}^{TM}$ by following method, and getting the total tracking program power demand of battery energy storage station:

If $P_{ES}^{TM} > 0$, and $P_{ES}^{TM} > P_{ES}^{MAD}, P_{ES}^{TM} = P_{ES}^{MAD}$;

If $P_{ES}^{TM} < 0$, and $|P_{ES}^{TM}| > |P_{ES}^{MAC}|, P_{ES}^{TM} = P_{ES}^{MAC}$ in above formulation, $P_{SWP}$ is the wind and photovoltaic total generation power; $\Delta t$ is control cycle; $P_{SWP}^{AP}$ and $P_{SWP}^{NP}$ are wind and photovoltaic plan power at this time and next time, respectively; $P_{ES}^{MAC}$ and $P_{ES}^{MAD}$ are the maximum allowable charge power and the minimum allowable discharge power, respectively;

in step B3, the specific calculation steps of system frequency regulation power required total power demand of battery energy storage station include:

reading real system frequency regulation power command value $P_{ES}^{AGC}$;

when the sign of $P_{ES}^{AGC}$ is positive, it indicates that the battery energy storage station is discharge state, then judging whether $P_{ES}^{AGC}$ satisfies the maximum allowable discharge power constraints: $P_{ES}^{AGC} \leq P_{ES}^{MAD}$, if violating the condition, $P_{ES}^{TM} = P_{ES}^{MAD}$, or $P_{ES}^{TM} = P_{ES}^{AGC}$;

when the sign of $P_{ES}^{AGC}$ is negative, it indicates that the battery energy storage station is charge state, then judge whether $P_{ES}^{AGC}$ satisfies the maximum allowable charge power constraints: $|P_{ES}^{AGC}| \leq |P_{ES}^{MAC}|$, if violating the condition, $P_{ES}^{TM} = P_{ES}^{MAC}$, or $P_{ES}^{TM} = P_{ES}^{AGC}$;

in step B4, the specific calculation steps of total peak shaving power demand of battery energy storage station include:

firstly, reading real the peak shaving curve value and system load curve value at present, and determining the total power demand $P_{ES}^{TM}$ of the battery energy storage station at this time by following formulation: $P_{ES}^{TM} = P^{AP} - P_L$ secondly, judging and re-correcting the $P_{ES}^{TM}$ by following method, and get the total peak shaving power demand of battery energy storage station:

if $P_{ES}^{TM} > 0$, and $P_{ES}^{TM} > P_{ES}^{MAD}, P_{ES}^{TM} = P_{ES}^{MAD}$;

if $P_{ES}^{TM} < 0$, and $|P_{ES}^{TM}| > |P_{ES}^{MAC}|, P_{ES}^{TM} = P_{ES}^{MAC}$ in above formulation, $P_L$ and $P^{AP}$ are the system load curve value and the peak shaving power, respectively;

in step B5, taking the battery energy storage station maximum allowed discharge power as the safe and stable control need total power of the battery energy storage;

in step B6, reading directly the total power of the battery energy storage station need that is sent by external dispatch center.

3. The monitoring and controlling method according to claim 1, is characterized that, in step C, the specific method to determine all the power command values of said the energy storage substations of the battery energy storage power plant includes:

When the total power demand of the battery energy storage power plant is positive, the power command values of the energy storage substations $P_{substation\ i}$ is:

$$P_{substationi} = \frac{u_{substationi} SOC_{substationi}}{\sum_{i=1}^{S}(u_{substationi} SOC_{substationi})} P_{ES}^{TM}$$

If there is any substation i power demand values $P_{substation\ i}$ that can satisfies $P_{substation\ i} > 0$ and $P_{substationi} > P_{substationi}^{MAD}$, re-determining $P_{substation\ i}$ according to following formulations:

$$P_{substationi} = \frac{u_{substationi} P_{substationi}^{MAD}}{\sum_{i=1}^{S}(u_{substationi} P_{substationi}^{MAD})} P_{ES}^{TM}$$

$$P_{substationi}^{MAD} = \sum_{k=1}^{L} u_k P_k^{MAD}$$

When the total power demand of the battery energy storage power plant is negative, the power command values of the energy storage substations $P_{substation\ i}$ is:

$$P_{substationi} = \frac{u_{substationi} SOD_{substationi}}{\sum_{i=1}^{S}(u_{substationi} SOD_{substationi})} P_{ES}^{TM}$$

If there is any substation i power demand values $P_{substation\ i}$ that can satisfies $P_{substation\ i} > 0$ and $|P_{substationi}| > |P_{substationi}^{MAC}|$, re-determining $P_{substation\ i}$ according to following formulations:

$$P_{substationi} = \frac{u_{substationi} P_{substationi}^{MAC}}{\sum_{i=1}^{S}(u_{substationi} P_{substationi}^{MAC})} P_{ES}^{TM}$$

$$P_{substationi}^{MAC} = \sum_{k=1}^{L} u_k P_k^{MAC}$$

In above formulations, $u_{substationi}$ is controllable state of the substation i; $SOC_{substation\ i}$ is charge state value of the substation i; $SOD_{substationi}$ is discharge state value of the substation i, $SOD_{substationi} = 1 - SOC_{substationi}$; S is the number of the substation; $P_{ES}^{TM}$ is total power demand of the battery energy storage power plant;

$P_{substation\ i}$ is total power demand of the substation i; $P_{substationi}^{MAD}$ is the maximum allowable discharge power of the substation i; $P_{substationi}^{MAC}$ is the maximum allowable charge power of the substation i; $P_k^{MAD}$ is the maximum allowable discharge power of energy storage unit k; $P_k^{MAC}$ is the maximum allowable discharge power of energy storage unit k.

4. The monitoring and controlling method according to claim 1, is characterized that, in step D, the specific method to calculate all the power command values of the energy storage units includes: according to energy storage substation power command value sign, decide to choose the maximum allowable discharge power or charging power to calculate decision variable of each energy storage unit, and then calculate the power command value of each storage unit; and judging whether each energy storage unit meets the constraints of the maximum allowable discharge power or allowable charge power or not, if the storage units violating corresponding constraints, recalculate the power command value through the maximum allowable discharge power or the maximum allowable charge power of the storage units; or end the judgment.

5. The monitoring and controlling method according to claim 4, is characterized that, the specific method in said step D includes:

Step D1. When the command power $P_{substation\ i}$ of the energy storage substation i is positive, the method to calculate the command power of each units of the energy storage substation includes following steps:

D11) Calculating each decision variable $x_i$ of storage units through genetic algorithm;

D12) Calculating each command power $P_i$ of storage units through following formulation:

$$P_i = \frac{x_i u_i SOC_i}{\sum_{i=1}^{L}(x_i u_i SOC_i)} P_{substation\ i}$$

D13) judging whether the each command power $P_i$ of storage units gained after step D2 meets below storage units the maximum allowable discharge power active constraints: $P_i \leq P_i^{MAD}$ D14) if there are any units that violate the constraints of the maximum allowable discharge power, re-determining each command power $P_i$ of storage units i according to following formulation; or end the judgment;

$$P_i = \frac{x_i u_i P_i^{MAD}}{\sum_{i=1}^{L}(x_i u_i P_i^{MAD})} P_{substation\ i}$$

Step D2. When the command power $P_{substation\ i}$ of the energy storage substation i is negative, the method to calculate the command power of each units of the energy storage substation includes following steps:

D21) Calculating each decision variable $x_i$ of storage units through genetic algorithm;

D22) Calculating each command power $P_i$ of storage units through following formulation:

$$P_i = \frac{x_i u_i SOC_i}{\sum_{i=1}^{L}(x_i u_i SOC_i)} P_{substation\ i}$$

D23) judging whether the each command power $P_i$ of storage units gained after step D2 meets below storage units the maximum allowable charge power active constraints: $|P_i| \leq |P_i^{MAC}|$ D24) if there are some units that violate the constraints of the maximum allowable charge power, re-determining each command power $P_i$ of storage units i according to following formulation; or end the judgment;

$$P_i = \frac{x_i u_i P_i^{MAC}}{\sum_{i=1}^{L}(x_i u_i P_i^{MAC})} P_{substation\ i}$$

In above formulations, $u_i$ is controllable state of the substation i; other values are 0, and $x_i$ is 0-1 decision variable; $SOC_i$ is charge state value of the unit i; $SOD_i$ is discharge state value of the unit i, $SOD_i = 1 - SOC_i$; L is the number of the unit; $P_i^R$ is rated power of the unit i; $P_{substationi}$ is total power demand of the substation i; $P_i^{MAD}$ is the maximum allowable discharge power of the unit i; $P_i^{MAC}$ is the maximum allowable charge power of the unit i.

6. The monitoring and controlling method according to claim 5, is characterized that, the method to calculate the decision variable of each unit in said step D11 includes following steps:

(11a) Determining the individual number N of the group, the number of genes of each individual is the number L of the storage unit, making binary codes for each individual, and a randomly generate N individuals as the initial group, obtaining 0 and 1 gene cluster combination, and letting evolution algebra counter value G=0;

(11b) Judging whether the evolution algebra counter value G is less than or equal to the maximum evolution generation counter value $G^{max}$ or not, and whether each individual meets the constraints of the following formula: If the above two conditions are both met, go to step 11c; Otherwise, skip to step 11f;

$$\left| \sum_{i=1}^{L}(x_i u_i \alpha_i P_i^{MAD}) - P_{Lithium}^{TM} \right| > 0$$

(11c) Calculating corresponding fitness $S_k$ of each individual k based on the following formulation;

$$S_k = \left| \sum_{i=1}^{L}(x_i u_i \alpha_i P_i^{MAD}) - P_{Lithium}^{TM} \right|, \text{ where } k = 1, \ldots N$$

(11d) Based on the fitness value calculated in step 11c, making selection according to the principle of survival of the fittest, and then restructure and mutate according to crossover and mutation probability separately to get off springs;

(11e) Based on the following objective function (I) selecting the optimal offspring, and insert it into the population for substitution in accordance with the insertion probability; then let G=G+1, and skip to step 11b;

$$\min f(x_1, x_2, \ldots x_L) = \min \left\{ \sum_{i=1}^{L} (x_i u_i P_i^{MAD}) \right\} \quad (\text{I})$$

$$\text{s.t.} \begin{cases} \left| \sum_{i=1}^{L} (x_i u_i P_i^{MAD}) - P_{Lithium}^{TM} \right| \geq 0 \\ x_i \in \{0, 1\} \ (i = 1, 2 \ldots L) \end{cases}$$

(11f) Compute the optimal solution satisfied the objective function (I), decoding the individual of the optimal solution, obtaining strings arrangement of gene combinations, and the value of each gene is decision variable values $x_i$ of the corresponding storage unit i, where i=1, . . . , L;

The method to calculate the decision variable $x_i$ of each unit in said step D211 includes following steps:

(21a) Determining the individual number N of the group, the number of genes of each individual is the number L of the storage unit, make binary codes for each individual, and a randomly generating N individuals as the initial group, obtaining 0 and 1 gene cluster combination, and letting evolution algebra counter value G=0;

(21b) Judging whether the evolution algebra counter value G is less than or equal to the maximum evolution generation counter value $G^{max}$ or not, and whether each individual meets the constraints of the following formula: If the above two conditions are both met, go to step 11c; Otherwise, skip to step 11f;

$$\left| \sum_{i=1}^{L} (x_i u_i \alpha_i P_i^{MAC}) - P_{Lithium}^{TM} \right| > 0$$

(21c) Calculating corresponding fitness $S_k$ of each individual k based on the following formulation;

$$S_k = \left| \sum_{i=1}^{L} (x_i u_i \alpha_i P_i^{MAC}) - P_{Lithium}^{TM} \right|, \text{ where } k = 1, \ldots N$$

(21d) Based on the fitness value calculated in step 21c, making selection according to the principle of survival of the fittest, and then restructure and mutate according to crossover and mutation probability separately to get off springs;

(21e) Based on the following objective function (II) selecting the optimal offspring, and inserting it into the population for substitution in accordance with the insertion probability; then let G=G+1, and skip to step 21b;

$$\min f(x_1, x_2, \ldots x_L) = \min \left\{ \sum_{i=1}^{L} (x_i u_i P_i^{MAC}) \right\} \quad (\text{II})$$

$$\text{s.t.} \begin{cases} \left| \sum_{i=1}^{L} (x_i u_i P_i^{MAC}) - P_{Lithium}^{TM} \right| \geq 0 \\ x_i \in \{0, 1\} \ (i = 1, 2 \ldots L) \end{cases}$$

(21f) Computing the optimal solution satisfied the objective function (II), decoding the individual of the optimal solution, obtaining strings arrangement of gene combinations, and the value of each gene is decision variable values $x_i$ of the corresponding storage unit i, where i=1, . . . , L.

7. A monitoring and controlling system for megawatt level battery energy storage power plant is characterized that, comprising:

a central monitoring and controlling module stored in a memory, being used to determine the power command value of each energy storage substation of the battery energy storage power plant, and sending it to all the local monitoring and controlling modules;

the local monitoring and controlling modules, being used to calculate the power command value of each energy storage unit of the energy storage substations controlled by it, and sending it to each energy storage unit, and upload to the central monitoring and controlling module to store;

between said central monitoring and controlling module and said local monitoring and controlling modules, the data transmission and communication are carried out through communication networks, said communication networks adopt real time and non real time communication parallel network structure;

said central monitoring and controlling module includes:

a central support module, being used to read the data of the battery energy storage plant, and send it to central storage module;

a central power management module, being used to calculate real timely total power demand of the battery energy storage plant and determine the power command value of each energy storage unit of the power plant according to specific application, and sending it to central storage module and central real time communication module;

a central storage module, being used to storage the data of battery energy storage and the power command value of each energy storage substation, and give the data and the power command values to corresponding interface variables for the local central monitoring and controlling module and external dispatch center to call; and a central communication module, including central real time communication module and central non real time communication module, said central real time communication module communicates real time with the local monitoring and controlling module and external dispatch center through real time communication network; said central non real time communication module communicates with the local monitoring and controlling module and external dispatch center through non real time communication network;

said central power management module includes:

smooth wind/photovoltaic power output module, being used to calculate real time total power demand of the battery energy storage plant that is smooth wind/photovoltaic generation output fluctuation required;

tracking program power generation module, being used to compute total power demand of the battery storage plant real-time for tracking program power;

system frequency regulation module, being used to compute total power demand of the battery storage plant real-time for frequency regulation;

peak shaving module, being used to calculate total power demand of the battery storage plant real-time for shaving peak;

security and stability control module, being used to calculate total power demand of the battery storage plant real-time for safe and stable control;

energy storage power station total power demand real-time allocation module, being used to calculate the power command value of each energy storage substation according to the battery energy storage need total power computed by any above said module calculation or sent directly by the external dispatch center; and data process module, being used to read the real time data that is transmitted through the central real time communication module, and send the data to smooth wind/photovoltaic power output module, tracking program generation module, system frequency regulation module, peak shaving module, security and stability control module, or energy storage power station total power demand real-time allocation module to compute, and then send the calculation results to the central real time communication module and the central storage module.

8. The monitoring and controlling system according to claim 7, is characterized that, said local monitoring and controlling module includes:

a local system support module, being used to read power command values of the relevant energy storage substations of the battery storage energy station and real time, non real time data of all energy storage units, and sending it to the local storage module;

a local power management module, being used to calculate all the power demand values of the energy storage units of the energy storage substation, and sending it to the corresponding energy storage units;

a local storage module, being used to temporary storage power command value of the energy storage substation, and all the power command values, real time data, and non real time data of the energy storage units; and send all the power command values and real time data of the energy storage units to the central communication module to storage through the local real time communication module; and a local communication module, including local real time communication module and local non real time communication module, said local real time communication module communicates real time with the central monitoring and controlling module and all of energy storage units through real time communication network, said local non real time communication module communicates with the central monitoring and controlling module and all of the energy storage units through non real time communication network.

\* \* \* \* \*